Sept. 4, 1928.

H. A. SELAH

CONDUIT FITTING

Filed June 30, 1925

1,683,414

Inventor
Howard A. Selah
By
Attorney

Patented Sept. 4, 1928.

1,683,414

UNITED STATES PATENT OFFICE.

HOWARD A. SELAH, OF ERIE, PENNSYLVANIA, ASSIGNOR TO ERIE MALLEABLE IRON COMPANY, OF ERIE, PENNSYLVANIA, A CORPORATION OF PENNSYLVANIA.

CONDUIT FITTING.

Application filed June 30, 1925. Serial No. 40,540.

This invention is designed to adapt conduit fittings to conduit boxes having openings through the walls thereof, such as are common with boxes having a plurality of openings with detachable covers and also involves the making of such a fitting adapted to secure a threadless conduit. Other features and details of the invention will appear from the specification and claims.

The invention is illustrated in the accompanying drawings as follows:—

Figure 1:
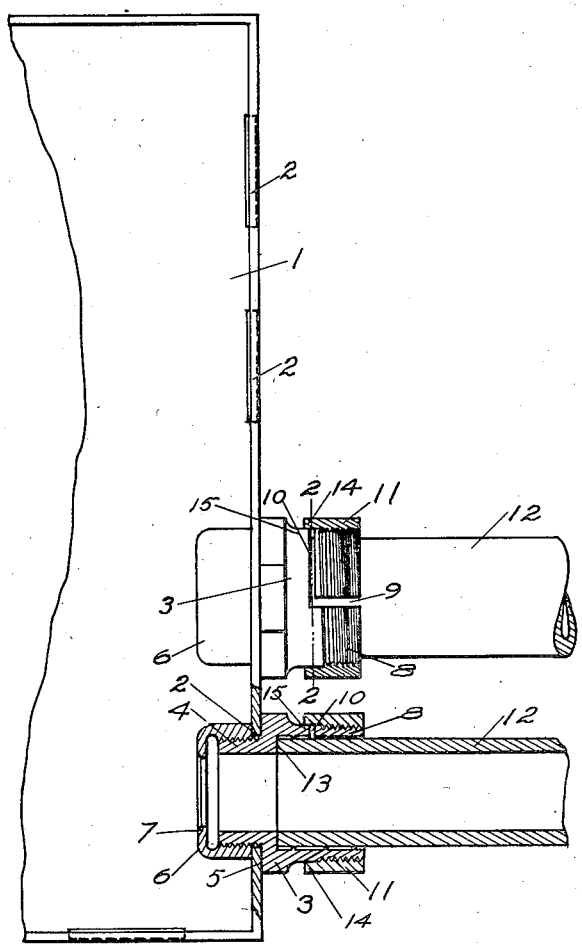

Fig. 1 shows a side view of a portion of a conduit box with a number of conduit connections leading thereto.

Figure 2:
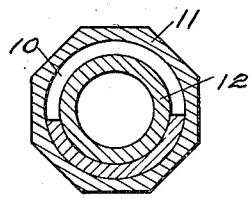

Fig. 2 a section on the line 2—2 in Fig. 1.

1 marks the box. This has a series of openings 2 in its wall in the usual form. Some of the openings which are not used are provided with the detachable covers as is the common practice.

A fitting 3 has a screw-threaded projection 4 which extends through the opening 2. It is provided with a shoulder 5 which engages the face of the box adjacent to the opening. A nut 6 is screwed on to the projection at the side of the box and is adapted to clamp the fitting to the walls of the box adjacent to the opening.

The nut is preferably provided with an interiorly extending flange 7 which acts as a guard over the end of the projection and also makes a smooth surface against which the conductor lies.

The body also has an extension 8 opposite the projection 4. This extension has a tapered screw thread and is provided with an axially extending slot 9 terminating in a circumferentially extending slot 10 so that the extension is readily contractible. A nut 11, preferably tapered to correspond to the taper of the extension, is screwed on the extension and by its action contracts the extension upon an inserted conduit 12. The fitting is provided with a shoulder 13 which receives the end of the conduit 12.

The nut 11 has an extension 14 which slides over a part 15 of the fitting inside the slot 10 and this makes a closure over the slot 10.

With this structure boxes with openings having detachable covers may be arranged to readily receive threadless conduits and the fittings are rigidly and readily secured to the box as desired.

What I claim as new is:—

In a conduit fitting, the combination of a body having an extension, said extension having a cylindrical surface and in continuation thereof a screw-threaded end and an axially extending slot extending into the screw-threaded portion, said axially extending slot terminating in a circumferential slot; and a nut on the screw-threaded extension adapted to contract the same, said nut having a cylindrical projection adapted to close the circumferential slot, said cylindrical projection telescoping the cylindrical portion on the extension.

In testimony whereof I have hereunto set my hand.

HOWARD A. SELAH.